United States Patent
Chi-te et al.

(10) Patent No.: US 6,976,880 B1
(45) Date of Patent: Dec. 20, 2005

(54) CARD CONNECTOR

(75) Inventors: Kuan Chi-te, Shulin (TW); Hsieh Zhi-wei, Shulin (TW)

(73) Assignee: L&K Precision Technology Co., Ltd., Taipei (TW)

( * ) Notice: Subject to any disclaimer, the term of this patent is extended or adjusted under 35 U.S.C. 154(b) by 0 days.

(21) Appl. No.: 11/074,654

(22) Filed: Mar. 9, 2005

(51) Int. Cl.[7] ............................................. H01R 24/00
(52) U.S. Cl. ........................ 439/630; 439/159; 439/946
(58) Field of Search ............................... 439/152, 155, 439/159, 160, 630, 946

(56) References Cited

U.S. PATENT DOCUMENTS

| | | | | |
|---|---|---|---|---|
| 6,155,853 A | * | 12/2000 | Kajiura | 439/159 |
| 6,361,338 B1 | * | 3/2002 | Chang | 439/159 |
| 6,394,827 B2 | * | 5/2002 | Nogami | 439/159 |
| 6,802,726 B2 | * | 10/2004 | Chang | 439/159 |

* cited by examiner

Primary Examiner—Gary Paumen
Assistant Examiner—James R. Harvey
(74) Attorney, Agent, or Firm—Troxell Law Office, PLLC

(57) ABSTRACT

A card connector comprises an insulative housing, a plurality of conductive terminals received in the insulative housing, a guiding and restraining device, a shell and a driven shaft, wherein the guiding and restraining device includes a leading slot, a slider having a first and a second slot, a restraining groove, a guiding rod and a resilient element. In the process of the electronic card that is inserted and positioned in the card connector, the slider is sliding along the leading slot of the resembling zone, meanwhile, the guiding rod is sliding along the first and the second slot and is fixed at the restraining groove; thereby the driven shaft is pushed outwardly and contact the shell; as long as the driven shaft contacts an inspection circuit, thereby enabling the card connector communicate data.

7 Claims, 3 Drawing Sheets

CARD CONNECTOR

BACKGROUND OF THE INVENTION

1. Field of the Invention

The present invention relates to a card connector, and particularly to a card connector which is adapted to communicate data between an electronic card and a mainboard and inspects if the electronic card inserted in properly.

2. Related Art

As is well-known, an electronic card has to cooperate with a card connector for data communication. There are many kinds of conventional electronic cards designed for different applied devices; therefore, for a convenient use with the electronic cards, most of card connectors have an eject device for an easily insertion or ejection of the electronic cards.

Furthermore, to follow a trend of minimizing the size of hi-tech production, a required inserting length of electronic card provided by a card connector become shorter. Accordingly, it is not easy to sense if the electronic card inserted properly; moreover, an improper insertion of the electronic card will cause unfirmly data communication or even damage the electronic card or card connector itself. Thus it is quite important to improve the card connector to equip a device for ensuring a proper insertion of the electronic card.

SUMMARY OF THE INVENTION

Accordingly, an object of the present invention is to provide a card connector which inspects if an electronic card being properly position or not.

To achieve the above-mentioned objects, a card connector in accordance with the present invention comprises an insulative housing a plurality of conductive terminals received in the insulative housing, a guiding and restraining device, a shell and a driven shaft. As the electronic card is inserted in the card connector, it will be properly positioned in the insulative housing by the guiding and restraining device, and meanwhile the driven shaft is pushed outwardly and contacts an inspection circuit of the shell; thereby enabling the card connector communicate data between the electronic card and applied devices.

DESCRIPTION OF THE PREFERRED EMBODIMENTS

Figure 1:
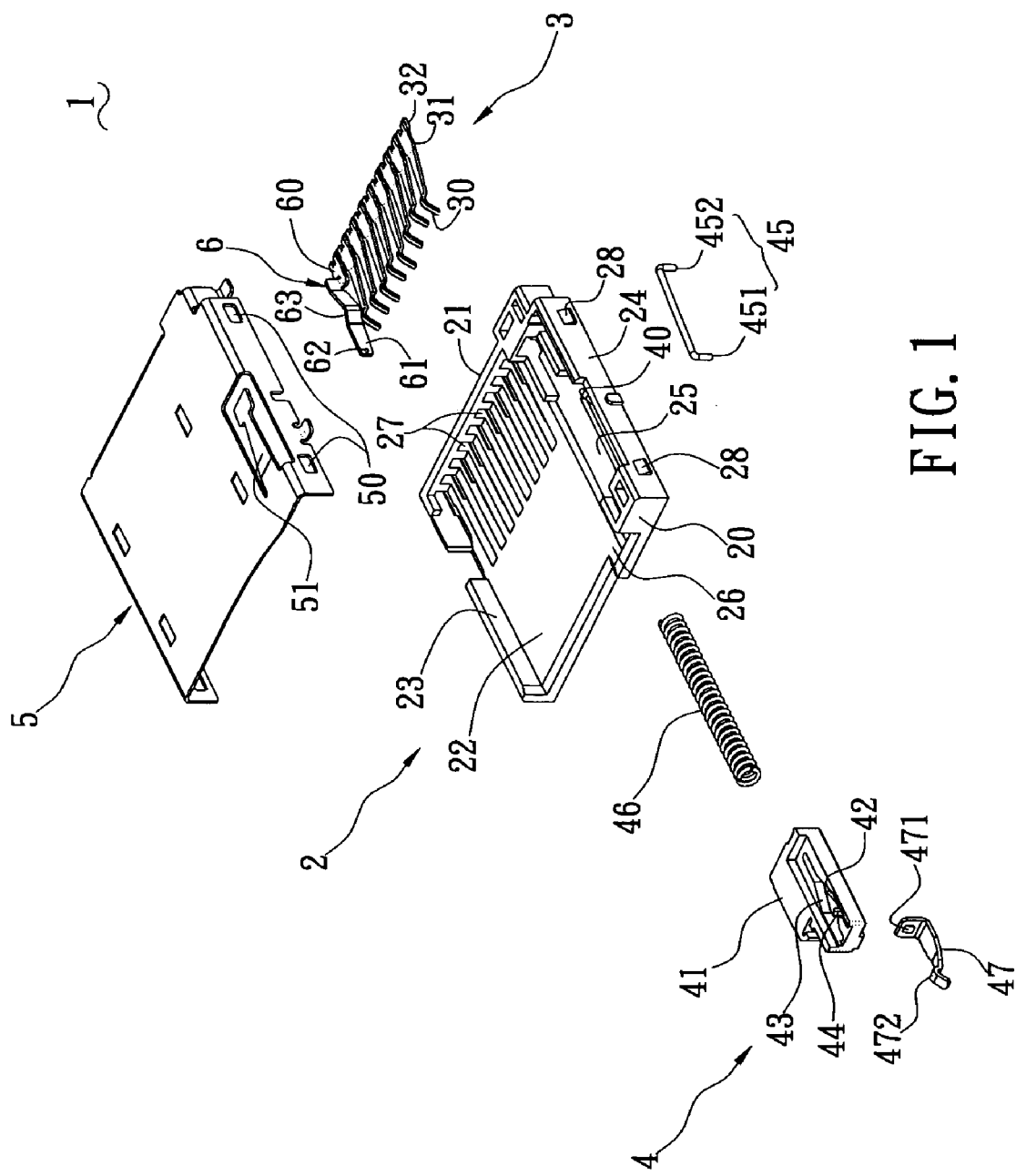
FIG. 1 is an exploded perspective view of a card connector of the present invention.

With reference to FIG. 1, a card connector 1 of the present invention comprises an insulative housing 2, a plurality of conductive terminals 3 received in the insulative housing 2, a guiding and restraining device 4, a shell 5 and a driven shaft 6.

The insulative housing 2 is flat and rectangle includes a mating surface 20 and a connecting surface 21 corresponding to short sides of the insulative housing 2, a bottom face 22 and two sides 23, 24 being respectively adjacent to the mating surface 20 and the connecting surface 21, and an assembling zone 25 abutting to one of the two sides 23, 24, wherein the mating surface 26 having a mating slot 26, and a plurality of passageways 27 go through the connecting surface 21 being defined in an inner side of the connecting surface 20; moreover, latches 28 are formed respectively at the two sides 23, 24 being similar to right-angled trigon in appearance for fastening with the locking holes 50 (described below).

A plurality of conductive terminals 3 received in the plurality of passageways 27, each terminal comprising a contact portion 30, an interferential portion 31 and a soldering portion 32, wherein the soldering portion 32 connects with a signal circuit of a PCB(not shown).

A guiding and restraining device 4 cantileveredly assembled on the assembling zone 25 of the insulative housing 2 includes a leading slot 40, a slider 41, a first and a second guiding slot 42, 43, a restraining groove 44, a guiding rod 45 and a resilient element 46, wherein the leading slot 40 longitudinally positioned in the assembling zone 25 for serving the slider 41 moving longitudinally thereon. The first and a second guiding slot 42, 43 are arranged on the slider 41 for guiding an electronic card inserted in or out, which respectively forms a guiding length corresponding to a moving length of the slider 41. The restraining groove 44 positioned in a junction of the first and the second guiding slot 42, 43 for position the electronic card as the electronic card is inserted in or out. The guiding rod 45 wherein an end 451 thereof is fixed in the assembling zone 25 and another end 452 is slidable on the first and the second guiding slot 42, 43 and restrain groove 44. The resilient element 46 mounted on the assembling zone 25 is a compressed spring for providing returning force of the slider 41. Moreover, the slider 41 has a holding plate 47 at one side thereof, wherein an end of the holding plate 47 being bending and forming an interferential member 471, is assembled on the resembling zone 25, and another end forms a hump 472 for holding an electronic card therein (referring to FIG. 3 and FIG. 4).

Figure 5:
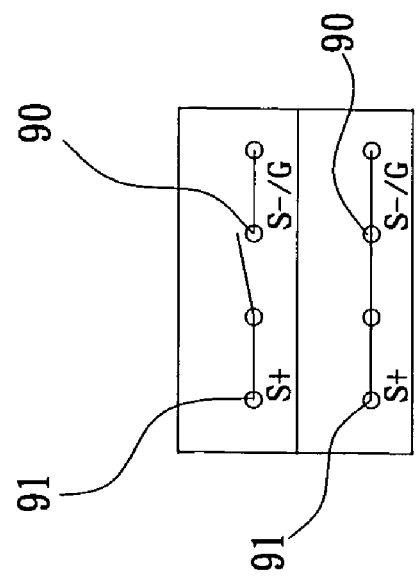
FIG. 5 is a schematic view showing a state of inspection circuit of a PCB when an electronic card being or not being inserted and positioned in the card connector.
Figure 2:
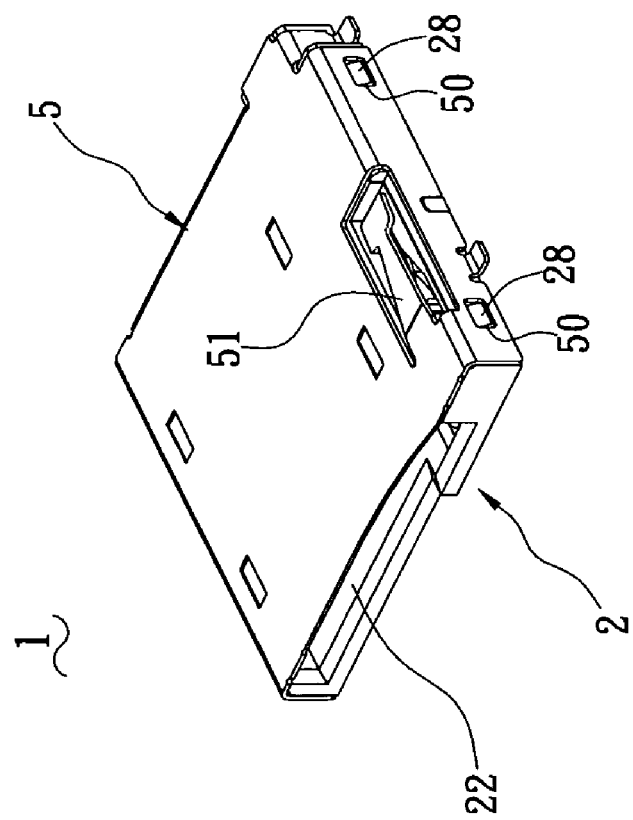
FIG. 2 is an assembled view of the card connector of FIG. 1.

A shell 5 assembled on a top of the insulative housing 2 and connecting with an end of an inspection circuit 90 of the PCB (referring to FIG. 5) has locking holes 50 at two sides thereof for fastening with the latches 28 of the insulative housing 2; additionally, the shell 5 forms a bouncy plate 51 positioned and opposite to the guiding and restraining device 4 for facilitating the guiding rod 46 moving firmly.

The driven shaft 6 is fixed at a side opposite to the guiding and restraining device 4 and adjacent to the connecting surface 21, wherein an end thereof protruding from the connecting surface 21 and linking with an inspection circuit 91 of the PCB (referring to FIG. 5) and which forms a bulge 62 thereon, another end 61 thereof being cantileveredly free and which forms an arcuated portion 63 on the middle of the driven shaft 6.

Figure 3:
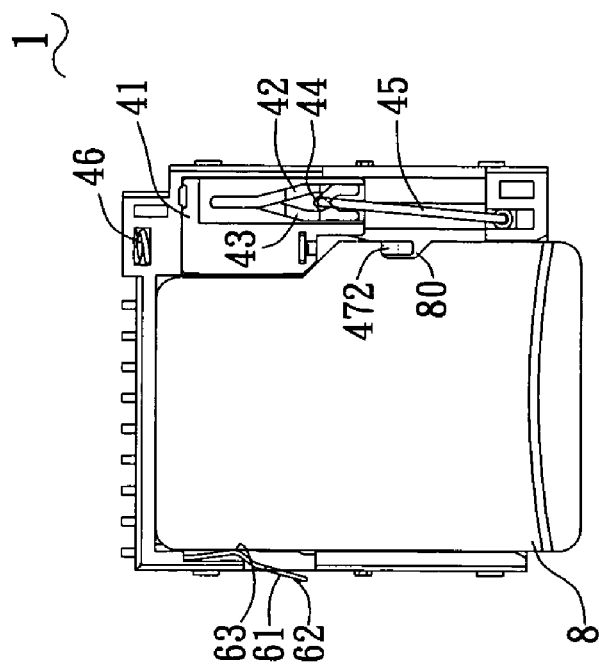
FIG. 3 and FIG. 4 are a top view of the card connector showing a state of an electronic card being inserted and positioned in the card connector, wherein a shell thereof is removed.
Figure 4:
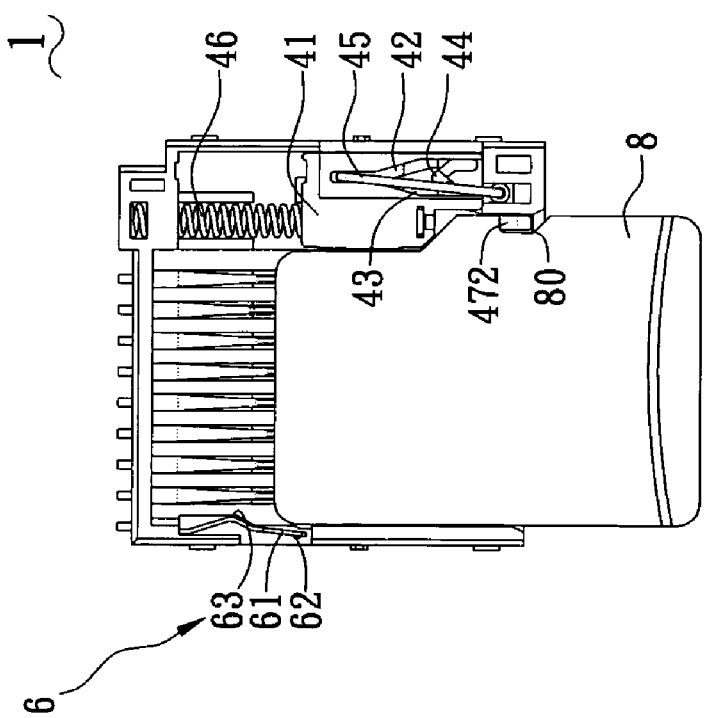

Further referring to FIGS. 3 and 4, which is a top view of the connector 1 without assembling the shell 5, wherein the FIG. 3 shows a state of a process of the electronic card 8 being inserted, and FIG. 4 shows a state of the electronic card 8 being inserted and positioned in the card connector 1. Referring to FIG. 3, when the electronic card 8 being inserted, a lateral recess 80 thereof engages with the hump 472 of the holding plate 47; meanwhile, the guiding rod 45 is sliding along the first and the second slot 42, 43, and the free end 61 of the driven shaft 6 still remains stay. As the electronic card 8 is positioned in the card connector 1 as shown in FIG. 4, the free end 61 of the driven shaft 6 is pushed outwardly and contact the shell 5; as long as the free end 61 contact an inspection circuit (referring to FIG. 5), thereby enabling the card connector 1 communicate data.

In the process of the electronic card that is inserted and positioned in the card connector 1, the slider 41 is sliding along the leading slot 40 of the resembling zone 25, at the mean time, the guiding rod 45 is sliding along the first and the second slot 42, 43 and is fixed at the restraining groove 44 as the electronic card is positioned in the connector 1; furthermore, the resilient element 46 restores returning force for the ejection of the electronic card.

It is understood that the invention may be embodied in other forms without departing from the spirit thereof. Thus, the present examples and embodiments are to be considered in all respects as illustrative and not.

What is claimed is:

1. A card connector adapted for assembling on a PCB (printed circuit board) for data communication between an electronic card and the PCB, comprising:

an insulative housing being flat and rectangle including a mating surface and a connecting surface corresponding to short sides of the insulative housing, a bottom face and two sides respectively adjacent to the mating surface and the connecting surface, and an assembling zone abutting to one of the two sides, wherein the mating surface having a mating slot, and a plurality of passageways going through the connecting surface and being defined in an inner side of the connecting surface;

a plurality of conductive terminals received in the plurality of passageways, each terminal comprising a contact portion, an interferential portion and a soldering portion, wherein the soldering portion connecting with a signal circuit of the PCB;

a guiding and restraining device cantileveredly assembled on the assembling zone of the insulative housing including:

a leading slot longitudinally positioned in the assembling zone;

a slider being slidable on the leading slot including a first and a second guiding slot which are arranged thereon;

a restraining groove positioned in a junction of the first and the second guiding slot;

a guiding rod wherein an end thereof is fixed in the assembling zone and another end is slidable on the first and the second guiding slot and leading slot; and a resilient element mounted on the assembling zone;

a shell assembled on a top of the insulative housing and connecting with an end of inspection circuit of the PCB; and a driven shaft fixed at a side opposite to the guiding and restraining device and adjacent to the connecting surface, wherein an end thereof protruding from the connecting surface and linking with the inspection circuit of the PCB, whereas another end thereof being cantileveredly free, and an arcuated portion formed on the middle of the driven shaft.

2. The card connector as claimed in claim 1, wherein the resilient element is a compressed spring.

3. The card connector as claimed in claim 2, wherein the free end of the driven shaft further comprises a bulge.

4. The card connector as claimed in claim 3, wherein the shell forms a bouncy plate positioned and opposite to the guiding and restraining device for facilitating the guiding rod moving firmly.

5. The card connector as claimed in claim 1, wherein the first guiding slot and the second guiding slot respectively form a guiding length corresponding to a moving length of the slider.

6. The card connector as claimed in claim 1, wherein the shell has locking holes at two sides thereof, and the insulative housing forms latches for fastening with the locking holes thereby retaining the shell on the insulative housing.

7. The card connector as claimed in claim 1, further comprises a holding plate, wherein an end thereof is fixed on the slider and another end forms a hump for holding an electronic card therein.

* * * * *